Patented Oct. 4, 1927.

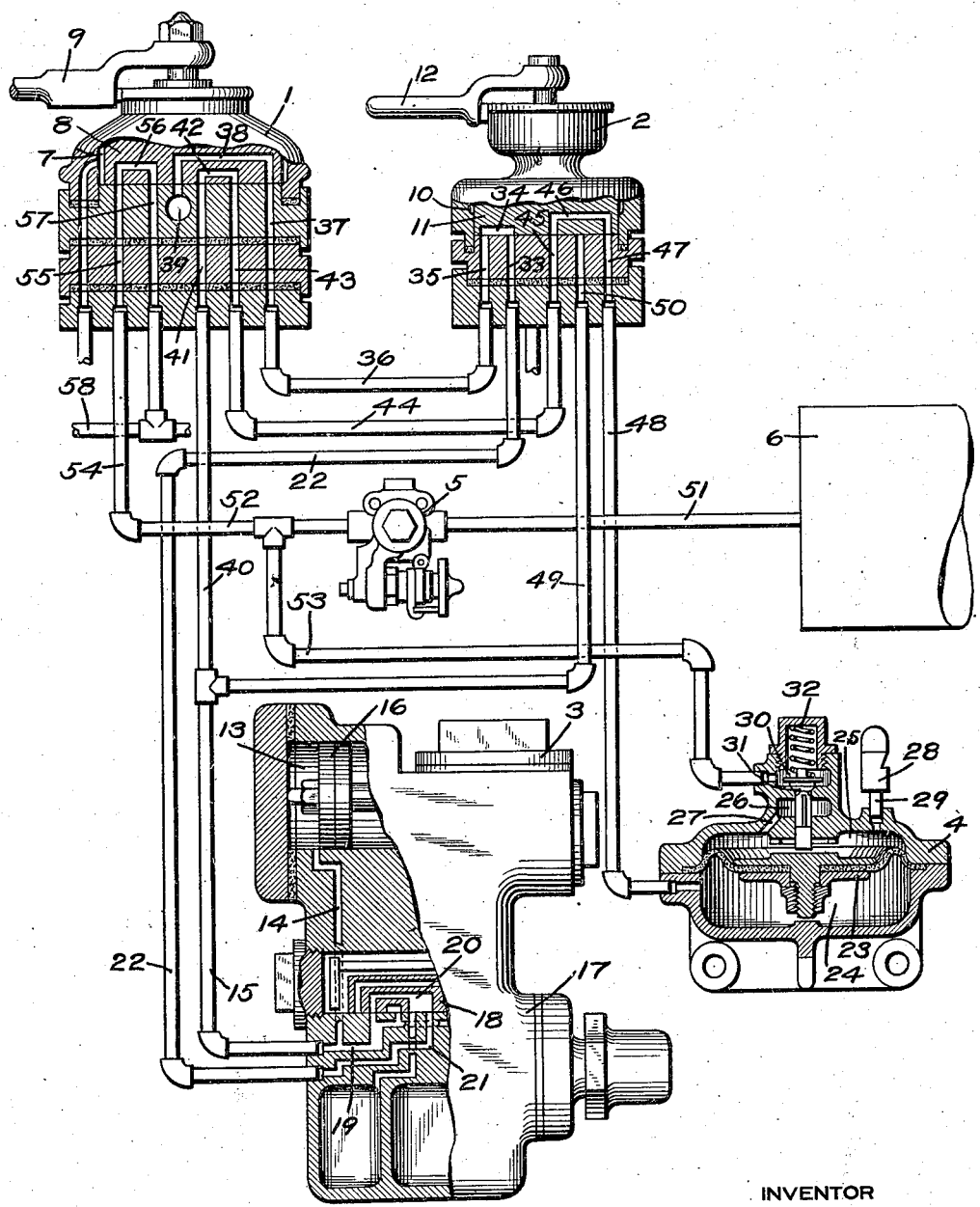

1,644,569

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed November 20, 1926. Serial No. 149,671.

This invention relates to fluid pressure brakes and more particularly to a locomotive brake equipment.

The usual standard locomotive brake equipment includes a distributing valve device, an automatic brake valve device, and an independent brake valve device, and the locomotive brakes are controlled, by operation of said brake valve devices, through a distributing valve release pipe and an application cylinder pipe which connects the brake valve devices to the distributing valve device.

With both of the brake valve devices in running position, the application cylinder of the distributing valve device is connected to the atmosphere through the distributing valve release pipe, while the application cylinder pipe connection is lapped at each brake valve device.

Since communication from the application cylinder to the release pipe is controlled by the equalizing slide valve of the distributing valve device, the locomotive brakes are released through the distributing valve release pipe only when the equalizing piston and slide valve of the distributing valve device are in release position.

If the equalizing piston and slide valve should creep or shift from the release position toward the service position, due to a decrease in brake pipe pressure, such as might be caused by a feed valve device working on a greater than usual range, the communication from the application cylinder to the distributing valve release pipe may be closed so that if fluid under pressure should leak into said application cylinder, there will be a tendency for the fluid pressure to build up therein and thus cause an application of the brakes.

One object of my invention is to provide means adapted to warn the operator when the locomotive brakes are beginning to apply, under circumstances such as described above.

Another object of my invention is to provide warning means adapted to produce a sound, distinctive from any other sound in a locomotive cab.

In the accompanying drawing, the single figure is a diagrammatic view, partly in section, of a locomotive fluid pressure brake equipment, with my invention embodied therein.

As shown in the drawing, the brake equipment may comprise an automatic brake valve device 1, an independent brake valve device 2, a distributing valve device 3, a warning valve device 4, a feed valve device 5, and a main reservoir 6.

The automatic brake valve device 1, may comprise a casing having a chamber 7, containing a rotary valve 8, adapted to be operated by a handle 9.

The independent brake valve device 2 may comprise a casing having a chamber 10 containing a rotary valve 11 adapted to be operated by a handle 12.

The distributing valve device 3 may comprise a casing having an application cylinder 13 in constant communication through the passage 14 with the application cylinder pipe 15, and containing an application piston 16 adapted to operate valves (not shown) for controlling the application and release of the locomotive brakes.

Also contained in the casing of the distributing valve device 3 is the usual equalizing portion 17, having an equalizing slide valve 18 adapted to be operated by a piston (not shown) and adapted, in release position, to connect passage 19 from the application cylinder 13, through cavity 20 in said slide valve, to passage 21, which passage is connected to the distributing valve release pipe 22.

The warning valve device 4 may comprise a casing containing a flexible diaphragm 23, forming a chamber 24 at one side and a chamber 25 at the opposite side, which chamber is connected to a whistle 28 through a passage and pipe 29. Said casing also has a chamber 30 containing a valve 31 subject to the pressure of a spring 32 at one side and having a stem adapted to be engaged and operated by the diaphragm 23.

With the brake valve handles 9 and 12 in running position, and the equalizing slide valve 18 of the distributing valve device 3 in release position, the application cylinder 13 of the distributing valve device 3 is connected to the atmosphere through passages 14 and 19, cavity 20 in the equalizing slide valve 18, passage 21, the distributing valve release pipe 22, passage 33 in the independent brake valve device 2, cavity 34 in the rotary valve 11, passage 35, pipe 36, passage 37 in the automatic brake valve device 1, cavity 38 in the rotary valve 8 and the atmospheric exhaust port 39. The application cylinder pipe 15, in constant communication with the application cylinder 13, is connected through pipe 40, passage 41, cavity 42 in the rotary valve 8 of the automatic brake valve device 1, passage 43, pipe 44, passage 45 in the independent brake valve device 2, cavity 46 in the rotary valve 11, passage 47 and pipe 48 to chamber 24 in the warning device 4. The application cylinder pipe 15 is also connected through pipe 49 to passage 50, which is lapped by the rotary valve 11 of the independent brake valve device 2, when in running position.

Fluid under pressure in the main reservoir 6 flows through pipe 51 to the feed valve device 5, which operates in the usual manner to supply fluid at the reduced pressure carried in the brake pipe. Fluid at the reduced pressure then flows through pipes 52 and 54, passage 55 in the automatic brake valve device 1, cavity 56 in the rotary valve 8 and passage 57 to the brake pipe 58, charging said brake pipe. Fluid at the reduced pressure also flows through pipes 52 and 53 to chamber 30 of the warning valve device.

If for any reason the equalizing slide valve 18 of the distributing valve device 3 should creep toward service position, while the brake valve devices are in running position, so as to cut off communication through cavity 20 from passage 19 to passage 21, any leakage of fluid under pressure into the application cylinder 13 tends to build up pressure on the face of piston 16 and thus cause movement of said piston so as to cause an application of the brakes.

Upon an increase in pressure in the application cylinder 13, as above described, said cylinder being connected to chamber 24 of the warning valve device 4, the pressure correspondingly builds up in chamber 24 and the diaphragm 23 is thereby operated to open the valve 31. Said valve being open, fluid under pressure is supplied from chamber 30 to chamber 26, thence through passage 27 and into chamber 25, which passage connects through pipe 29 to the whistle device 28, which produces a sound by the flow of fluid under pressure through said whistle to the atmosphere, in the well known manner.

The spring 32 is of such resistance that the diaphragm 23 will operate to open the valve 31 at a pressure of fluid in chamber 24 less than that required to operate the application piston 16 of the distributing valve device 3. Thus the whistle 28 will blow before the locomotive brakes start to apply.

The pressure required in chamber 24 of the warning valve device to cause movement of the diaphragm 23 and the opening of the valve 31 being low, such as 2 pounds, the quick rush of fluid under pressure into chamber 25 at the opposite side of said diaphragm 23, due to the opening of valve 31, causes a movement of the diaphragm by the pressure in chamber 25 against the lower pressure in chamber 24, so that the valve 31 is permitted to seat.

Fluid in chamber 25 then blows through the whistle 28 until the pressure in chamber 25 is reduced to a degree less than the pressure in chamber 24, when the diaphragm 23 is again operated by the higher pressure in chamber 24, to unseat the valve 31 so that the chamber 25 is again charged with fluid under pressure, causing said diaphragm to again operate so as to permit the valve 31 to seat.

The whistle 28 is thus caused to emit a pulsating sound, which characteristic distinguishes the sound from any other in the locomotive cab.

When the operator is thus warned of an undesired pressure built up in the application cylinder of the distributing valve device, he can move his independent brake valve handle so as to connect the application cylinder 13 through the application cylinder pipe 15, directly to atmosphere and thus he is enabled to prevent the locomotive brakes from being applied.

Having now described my invention, what I claim as new and desire to secure by Letters Patent, is:

1. In a fluid pressure brake, the combination with a locomotive brake equipment including a distributing valve device having an application cylinder, of means for warning the engineer in case the pressure in said chamber is unintentionally built up.

2. In a fluid pressure brake, the combination with a locomotive brake equipment including a distributing valve device having an application cylinder, of means operated by fluid under pressure unintentianally supplied to the application cylinder for warning the engineer.

3. In a fluid pressure brake, the combination with a locomotive brake equipment including a distributing valve device having an application cylinder, of means operated upon an unintentional increase in pressure in the application cylinder for intermittently sounding a signal.

4. In a fluid pressure brake, the combination with a locomotive brake equipment including a distributing valve device having an application cylinder and a brake valve device, of means operated by fluid under pressure supplied from said application cylinder in the running position of said brake valve device for warning the engineer.

5. In a fluid pressure brake, the combination with a locomotive brake equipment including a distributing valve device having an application cylinder, an automatic brake valve device, and an independent brake valve device, of means operated by fluid under pressure from said application cylinder as supplied only when both brake valve devices are in running position, for warning the engineer.

6. In a fluid pressure brake, the combination with a locomotive brake equipment including a distributing valve device having an application cylinder and a brake valve device, of a warning device comprising a signal, a valve for supplying fluid under pressure to operate said signal, and a movable abutment operated by fluid under pressure for actuating said valve, said abutment being operated by fluid supplied from said application cylinder.

7. In a fluid pressure brake, the combination with a locomotive brake equipment including a distributing valve device having an application cylinder and a brake valve device, of a warning device comprising a signal, a valve for supplying fluid under pressure to operate said signal, and a movable abutment operated by fluid under pressure for actuating said valve, said abutment being operated by fluid supplied from said application cylinder, when said brake valve device is in running position.

8. In a fluid pressure brake, the combination with a locomotive brake equipment including a distributing valve device having an application cylinder, of a warning device comprising a fluid pressure actuated signal, a valve for supplying fluid under pressure to said signal, and a movable abutment for operating said valve, said abutment being subject on one side to fluid supplied from said application cylinder and on the opposite side to the pressure of fluid supplied to said signal by the opening of said valve.

In testimony whereof I have hereunto set my hand.

CLYDE C. FARMER.